R. O. WILLIAMS.
DUST AND VALVE CAP.
APPLICATION FILED DEC. 6, 1918.

1,307,947.

Patented June 24, 1919.

Witness
Everett Lloyd Jr.

Inventor
R. O. Williams
By Victor J. Evans
Attorney

UNITED STATES PATENT OFFICE.

RALPH O. WILLIAMS, OF VICKSBURG, MICHIGAN.

DUST AND VALVE CAP.

1,307,947.  Specification of Letters Patent.  Patented June 24, 1919.

Application filed December 6, 1918. Serial No. 265,547.

*To all whom it may concern:*

Be it known that I, RALPH O. WILLIAMS, a citizen of the United States, residing at Vicksburg, in the county of Kalamazoo and State of Michigan, have invented new and useful Improvements in Dust and Valve Caps, of which the following is a specification.

This invention relates to new and useful improvements in dust caps for automobile tire valves and the principal object of the invention is to provide a cap made of resilient material and one which can be placed in position with the least possible effort.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
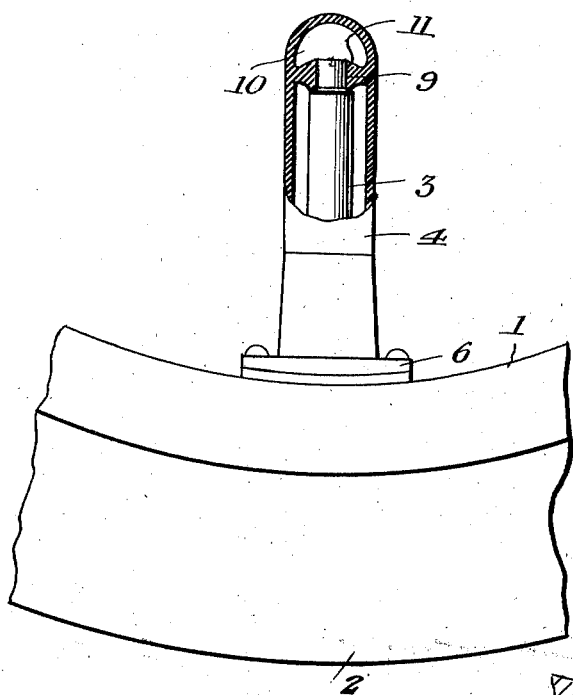
Figure 1 is a view partly in section showing my invention in use.
Figure 2:
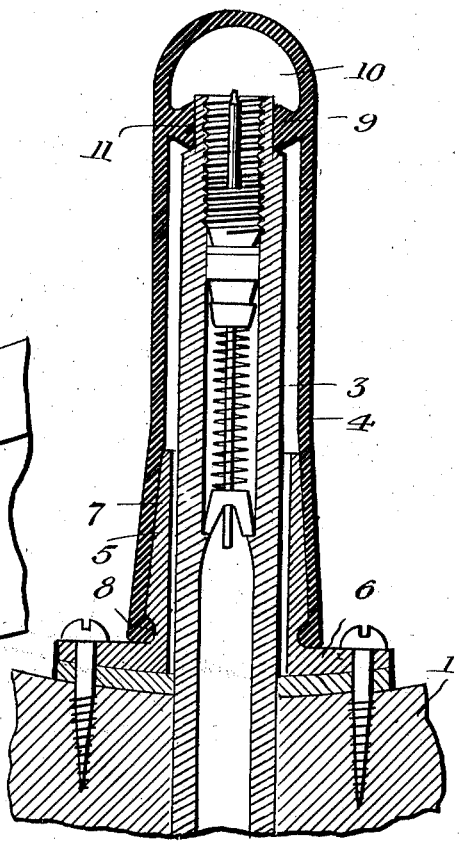
Fig. 2 is an enlarged sectional view of the device.

In these views, 1 indicates a portion of a wheel rim, 2 the tire and 3 the valve stem projecting through the usual hole in the rim.

In place of the usual screw threaded metal cap for covering the stem I use a cap 4, preferably made of rubber, which fits over the stem. The cap is held in position by means of a metal base 5, which is provided with a flange 6 adapted to be secured to the rim by screws or the like. This base is provided with a tubular part 7 of slightly tapering form and having a groove 8 adjacent the flange. The open end of the rubber cap fits over the tubular part with its beaded edge fitting in the groove 8. The closed end of the cap has a partition 9 therein, also formed of rubber, and providing an air chamber 10 in the end of the cap. This partition has an opening 11 therein which receives the small end of the valve stem.

It will thus be seen that the cover may be pushed on and removed from the metal base very quickly and with the least possible effort. The opening 11 is made smaller than the end of the valve stem, so that said stem will fit snugly into said opening, so as to make the air chamber 10 airtight.

With my invention it is not necessary to provide the stem with screw threads.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a rubber cap having a perforated partition adjacent its closed end forming an air chamber and means for securing the cap to the rim with the end of the stem in said partition.

In testimony whereof I hereby affix my signature.

RALPH O. WILLIAMS.